United States Patent [19]
Halverson et al.

[11] Patent Number: 5,273,709
[45] Date of Patent: Dec. 28, 1993

[54] HIGH NEUTRON ABSORBING REFRACTORY COMPOSITIONS OF MATTER AND METHODS FOR THEIR MANUFACTURE

[75] Inventors: Danny C. Halverson, Modesto; Garth W. Billings, Auburn; George M. Johnston, Santa Rosa, all of Calif.

[73] Assignee: Thermal Technology Inc., Santa Rosa, Calif.

[21] Appl. No.: 933,859

[22] Filed: Aug. 24, 1992

Related U.S. Application Data

[62] Division of Ser. No. 591,094, Oct. 1, 1990, Pat. No. 5,156,804.

[51] Int. Cl.$^5$ .............................................. B22F 3/12
[52] U.S. Cl. .................................. 419/45; 419/14; 419/19; 419/20; 419/38
[58] Field of Search ................ 419/14, 15, 17, 19, 419/20, 24, 38, 48, 45

[56] References Cited

U.S. PATENT DOCUMENTS

| | | | |
|---|---|---|---|
| 2,992,178 | 7/1961 | Lustman et al. | 252/478 |
| 3,245,782 | 4/1966 | Ray | 252/478 |
| 3,356,618 | 12/1967 | Rich et al. | 252/478 |
| 4,474,728 | 10/1984 | Radford | 376/339 |
| 4,605,440 | 8/1986 | Halverson et al. | 75/238 |
| 4,636,480 | 1/1987 | Hillig | 501/87 |
| 4,671,927 | 6/1987 | Alsop | 376/419 |
| 4,744,922 | 5/1988 | Blakely et al. | 252/478 |
| 4,789,520 | 12/1988 | Morimoto et al. | 376/419 |
| 4,826,630 | 5/1989 | Radford et al. | 252/478 |

*Primary Examiner*—Donald P. Walsh
*Assistant Examiner*—Daniel Jenkins
*Attorney, Agent, or Firm*—Henry P. Sartorio

[57] ABSTRACT

Neutron absorbing refractory $B_4C$-Gd and $Gd_2O_3$-Gd cermets, $B_4C$-Gd and $Gd_2O_3$-Gd metal-matrix composites, and $B_4C$-$Gd_2O_3$ ceramic-ceramic composites can be manufactured by applying fundamental thermodynamic and kinetic guidelines as processing principals.

Three steps are involved in the fabrication of these new compositions of matter. First, the starting materials are consolidated into a compacted porous green body. Next, the green body is densified using the appropriate method depending on the class of material sought: cermet, metal-matrix composite, or ceramic-ceramic composite. Finally, either during the densification process or by subsequent heat treatment, new phase evolution is obtained via interfacial chemical reactions occurring in the microstructures.

The existence of a new phase has been identified in $B_4C$-Gd and $B_4C$-$Gd_2O_3$ composites.

23 Claims, 5 Drawing Sheets

HIGH NEUTRON ABSORBING REFRACTORY COMPOSITIONS OF MATTER AND METHODS FOR THEIR MANUFACTURE

This application is a division of application Ser. No. 07/591,094, filed Oct. 1, 1990, now U.S. Pat. No. 5,156,804.

BACKGROUND OF THE INVENTION

This invention relates generally to boron carbide-gadolinium oxide, boron carbide-gadolinium, and gadolinium oxide-gadolinium compositions of matter and more particularly to boron carbide-gadolinium oxide ceramic composites and boron carbide-gadolinium and gadolinium oxide-gadolinium cermets or metal-matrix composites.

U.S. Pat. No. 4,605,440 by Halverson, Pyzik and Aksay, U.S. Pat. No. 4,704,250 by Cline and Fulton, and U.S. Pat. No. 4,718,941 by Halverson and Landingham all pertain to boron carbide-reactive metal composites and their manufacture. However, these patents do not show specific boron carbide-gadolinium compositions or methods for producing directly usable consolidated bodies thereof. U.S. Pat. Nos. 4,826,630 and 4,474,728 by Carlson and Radford, U.S. Pat. No. 4,744,922 by Blakely and Shaffer, U.S. Pat. No. 4,671,927 by Alsop, and U.S. Pat. Nos. 4,657,876 and 4,636,480 by Hillig describe various neutron absorbing materials.

The field of nuclear physics has matured and created a revolutionary impact on modern history. The applications of research in neutron-induced reactions appear both in other areas of fundamental research and in the practical areas of nuclear energy production.

The ultimate fate of a free neutron liberated through some reaction is either absorption by a nucleus, or transformation by beta decay. The latter process is so weak as to be negligible for practical applications. By a wide margin, the most important absorption process in a non-fissile nucleus is radiative capture.

Neutron capture can occur over nine orders of energy magnitude, slow or thermal neutrons from as low as $10^{-2}$ eV to fast neutrons as high as 14 MeV. Different atomic mechanisms are associated with the radiative capture of each. Neutron capture processes have lifetimes ranging from $10^{-22}$ seconds (thermal capture) to as long as $10^{-15}$ seconds (fast capture).

For practical applications involving slow neutrons, it is sufficient to work with the statistical theory of radiative capture. This topic is highly complex; however, qualitative consideration of materials can be made by initially examining their average capture cross section properties.

The nuclear cross section of a material is a measure of the probability of a particular process. In the case of radioative capture, the capture cross section is expressed as $\sigma$, and is the effective target area of the nucleus with which a neutron must interact to produce a given reaction. The unit of $\sigma$ is the barn (1 barn = $10^{-24}$ cm$^2$). Absorption cross sections for thermal neutrons range from $4.6 \times 10^{-4}$ barn for deuterium to $3.3 \times 10^6$ barns for xenon$^{135}$.

To protect nuclear reactor operating personnel against damaging biological effects of neutrons and gamma rays, shielding is required around nuclear reactors. Neutron and gamma ray fluxes in the range of $10^{13}$ to $10^{14}$ must be attenuated to $10^3$ particles/cm$^2$/sec to meet tolerance radiation levels.

To attenuate gamma rays, which interact primarily with the orbital electrons of atoms, a material with high atomic number containing a high density of these electrons is required. Examples are lead, tungsten, depleted uranium, or concrete containing high-Z elements in the form of scrap or heavy ore.

To attenuate neutrons, they must be slowed down and then absorbed. Hydrogenous materials such as water, concrete, or polyethylene are excellent moderators. The slowed neutrons must be absorbed without producing high-energy-capture gamma rays. This has historically been accomplished by using boron$^{10}$; however, even with boron$^{10}$ some gamma shielding outside the neutron shield is generally required.

When a neutron is absorbed by the nucleus of an atom an exothermic process results and the compound nucleus reaches an excited energy state between 4 and 10 MeV, as determined by the center-of-mass kinetic energy and the rest-mass energy difference of the final and initial nuclides. This state decays by the emission of electromagnetic (gamma) radiation, leaving the compound nucleus in a lower energy state. Subsequent radiative decay of this and lower energy states, i.e., a cascade of gamma rays, leaves the compound nucleus in its ground state, which may, or may not, be stable against alpha or beta decay (daughter products).

The inherent atomic processes associated with the radiative capture of neutrons results in exothermic reactions that typically prohibit the use of hydrogenous materials because of their low-temperature phase changes; e.g., water boils at 100° C., polyethylene softens near 87° C.

Boron metal also has its drawbacks. It corrodes easily and is physically unstable under irradiation. Alloying to overcome these problems merely reduces the boron content of the absorbing material. Because of these concerns, boron carbide has been used extensively as a neutron absorbing material in various types of nuclear reactors for several decades.

Boron carbide exists as a homogeneous range of boron and carbon compositions between 9 and 24 at. % C. The most common stoichiometries being B$_4$C (B$_{12}$C$_3$) and B$_{13}$C$_2$, both of which are boron rich. Richer boron stoichiometries, B$_8$C and B$_{25}$C, are also known to exist; however, these are less favored thermodynamically. The high boron content and refractory nature of B$_4$C (melting point $\approx$2350° C.) made it a choice candidate for high temperature neutron absorbing reactions.

The ideal neutron absorbing material would be light weight, refractory, not impart long-lived daughter products, be thermally shock resistant, of low density yet not too porous, be resistant to corrosion and oxidation, have high fracture toughness and high strength, and not promulgate dust on delivery or while in use. Low cost, obviously, would be another attractive advantage.

Boron carbide is refractory, has a specific gravity of 2.52, a modulus of rupture $\approx$300 MPa, and can be hot pressed into fully dense bodies. Boron carbide displays low fracture toughness, and also rapidly oxidizes above 800° C. In addition, boron carbide's thermal shock resistance is poor.

One way to increase the fracture toughness and thermal shock resistance of B$_4$C is by the addition of a metal phase, e.g., B$_4$C-metal cermets or metal-matrix composites. A cermet is defined as a ceramic-metal composite such that the final microstructure is $\geq$50 vol. % ceramic phases. A metal matrix composite is defined as a ceramic-metal composite such that the final microstructure is <50 vol. % ceramic phases. The ceramic phases can be the initial starting ceramic materials or reaction products that result from chemical reactions between two ceramic phases or between ceramic and metal phases.

Another way to increase the fracture toughness and strength of $B_4C$ is through the introduction of another ceramic phase, e.g., $B_4C$-$Al_2O_3$, $B_4C$-$TiB_2$, and $B_4C$-SiC composites. Although large increases in fracture toughness and strength are generally obtained with the addition of a metal phase, the introduction of another ceramic phase can increase toughness while maintaining the refractory nature of the composite.

One of the most appropriate metal phases to consider for the absorption of neutrons is gadolinium, Gd. This metal also exists in the form of a stable oxide known as gadolinium oxide, $Gd_2O_3$. Gadolinium has the highest nuclear capture cross section of any element known, $\sigma \approx 40,000$ barns, compared to $B^{10}$ with a $\sigma \approx 4,000$ barns.

Gadolinium offers mechanical and physical properties conducive to fabricating $B_4C$-Gd cermets or metal-matrix composites, according to the invention, that approach "ideal" neutron absorbing material conditions. For example, Gd is used as a burnable poison in shields and control rods in nuclear reactors. It has a melting point of 1313° C., a boiling point of $\approx 3000°$ C., and an $\alpha \rightarrow \beta$ transformation temperature of 1235° C. Gadolinium tarnishes slightly in air at room temperature; however, even at 1000° C. the oxidation rate is slow because of the formation of the tightly adhering oxide on the surface. It does not react with cold or hot water, but will react vigorously with dilute acids.

Gadolinium has the following mechanical properties: Tensile strength $\approx 122$ MPa, yield strength $\approx 17$ MPa, elongation $\approx 47\%$, reduction in area $\approx 58\%$, and an elastic modulus $\approx 56$ GPa. It also has a thermal expansion coefficient of $\approx 9 \times 10^{-6}/°$ C.

Gadolinium's very low modulus of elasticity indicates it should be substantially more resistant to thermal shock than $B_4C$. By forming a $B_4C$-Gd composite, according to the invention, it should be possible to obtain a refractory body with very high neutron absorbing capability and good thermal shock resistance. Because the specific gravity of Gd is 7.90, the addition of $B_4C$ will also reduce the composite's weight substantially. Also, according to the invention, the reactions between Gd and $B_4C$ during processing will introduce other ceramic phases into the composite resulting in a higher overall fracture toughness.

According to the invention, similar material properties should be obtained by combining $Gd_2O_3$ and $B_4C$, or $Gd_2O_3$ and Gd, to form ceramic-ceramic composites, cermets, or metal-matrix composites. For example, $Gd_2O_3$ has a specific gravity of 7.41 and a elastic modulus of $\approx 130$ GPa.

Accordingly, it is an object of the present invention to provide boron-carbide-gadolinium cermet compositions, boron-carbide-gadolinium metal-matrix compositions, boron-carbide-gadolinium-oxide compositions, gadolinium-oxide-gadolinium cermet compositions, and gadolinium-oxide-gadolinium metal-matrix compositions.

It is also an object of the invention to provide methods for forming boron-carbide-gadolinium cermet compositions, boron-carbide-gadolinium metal-matrix compositions, boron-carbide-gadolinium-oxide compositions, gadolinium-oxide-gadolinium cermet compositions, and gadolinium-oxide-gadolinium metal-matrix compositions.

It is another object of the invention to provide boron-carbide-gadolinium cermet compositions, boron-carbide-gadolinium metal-matrix compositions, boron-carbide-gadolinium-oxide compositions, gadolinium-oxide-gadolinium cermet compositions, and gadolinium-oxide-gadolinium metal-matrix compositions with refractory microstructures, and methods for forming same.

It is a further object of the invention to provide boron-carbide-gadolinium cermet compositions, boron-carbide-gadolinium metal-matrix compositions, boron-carbide-gadolinium-oxide compositions, gadolinium-oxide-gadolinium cermet compositions, and gadolinium-oxide-gadolinium metal-matrix compositions which are fully dense, and methods for forming same.

It is another object of the invention to provide articles of manufacture made from boron-carbide-gadolinium cermet compositions, boron-carbide-gadolinium metal-matrix compositions, boron-carbide-gadolinium-oxide compositions, gadolinium-oxide-gadolinium cermet compositions, and gadolinium-oxide-gadolinium metal-matrix compositions.

It is also an object of the invention to provide methods for making boron-carbide-gadolinium cermet compositions, boron-carbide-gadolinium metal-matrix compositions, boron-carbide-gadolinium-oxide compositions, gadolinium-oxide-gadolinium cermet compositions, and gadolinium-oxide-gadolinium metal-matrix compositions, and articles of manufacture thereof at relatively low cost.

SUMMARY OF THE INVENTION

The present invention provides a whole spectrum of specific compositions of boron-carbide-gadolinium, boron-carbide-gadolinium-oxide, and gadolinium-oxide-gadolinium composites which apply basic thermodynamic and kinetic principles to achieve these compositions. The invention includes a plurality of multi-phase compositions, including fully dense microstructures, and methods for selectively producing the desired compositions.

According to the invention, there are three major steps in the formation of these compositions of matter. First, the initial reactants must be properly prepared. This is accomplished by selecting the appropriate starting particle size distributions, dispersing and mixing the particles, and consolidating the particles into a state that is ready for step two.

Second, the capillarity thermodynamic criteria of achieving a rapid consolidation through the wetting of the $B_4C$ or $Gd_2O_3$ phase by the Gd metal phase (Gd metal or Gd alloy) must be obtained in the case of the $B_4C$-Gd cermets and $Gd_2O_3$-Gd cermets, respectively. Or, the condition of plastic flow of the Gd metal (or alloy) around the $B_4C$ or $Gd_2O_3$ must be obtained in the case of $B_4C$-Gd metal-matrix composites and $Gd_2O_3$-Gd metal-matrix composites, respectively. Or, the solid-state and/or liquid-state rearrangement of oxide and carbide phases around each other must be obtained in the case of $B_4C$-$Gd_2O_3$ composites.

The third step is to apply reaction thermodynamic criteria to the boron-carbide-gadolinium, boron-carbide-gadolinium-oxide or gadolinium-oxide-gadolinium compositions in order to achieve desired reaction products in the microstructure. Through this step, it is possible to take each respective composition of step two and react them to specific end products which result in different microstructures than those obtained in step two. In the case of the cermet or metal-matrix compositions, it is also possible to completely react all of the Gd metal or alloy thereof and any metastable phases which form during these processes to achieve a composite material which is completely without any metal phase or any phase representative of the initial starting constituents. That is, it is possible to start with a cermet or metal-matrix composition and end up with a multiphase ceramic composite.

In general it is necessary to apply the kinetics of how these boron-carbide-gadolinium, boron-carbide-gadolinium-oxide, and gadolinium-oxide-gadolinium compositions consolidate during the above processes in order to select the appropriate method of manufacture. Final consolidation involves the application of temperature to these bodies such that the microstructural phases will flow together or sinter. It may also involve the application of pressure with temperature in order to assure that fully dense final products are obtained.

DETAILED DESCRIPTION OF THE INVENTION

Gadolinium (or an alloy thereof) is a compatible metal phase with $B_4C$ or $Gd_2O_3$ ceramics and $Gd_2O_3$ is a compatible ceramic phase with $B_4C$ ceramic for the development of $B_4C$-Gd, $B_4C$-$Gd_2O_3$, and $Gd_2O_3$-Gd refractory composites for neutron absorption because the starting phases are reactive with each other.

Gadolinium and its oxide are terrestrially stable metal and ceramic phases, respectively. Gadolinium possesses the highest neutron capture cross section of any element known. This metal and its oxide is the third most abundant of the lanthanide series of elements in the periodic table. Only cerium and samarium are more plentiful. Its abundance makes it a cost effective alternative to boron-based neutron absorbing materials.

Figure 1:
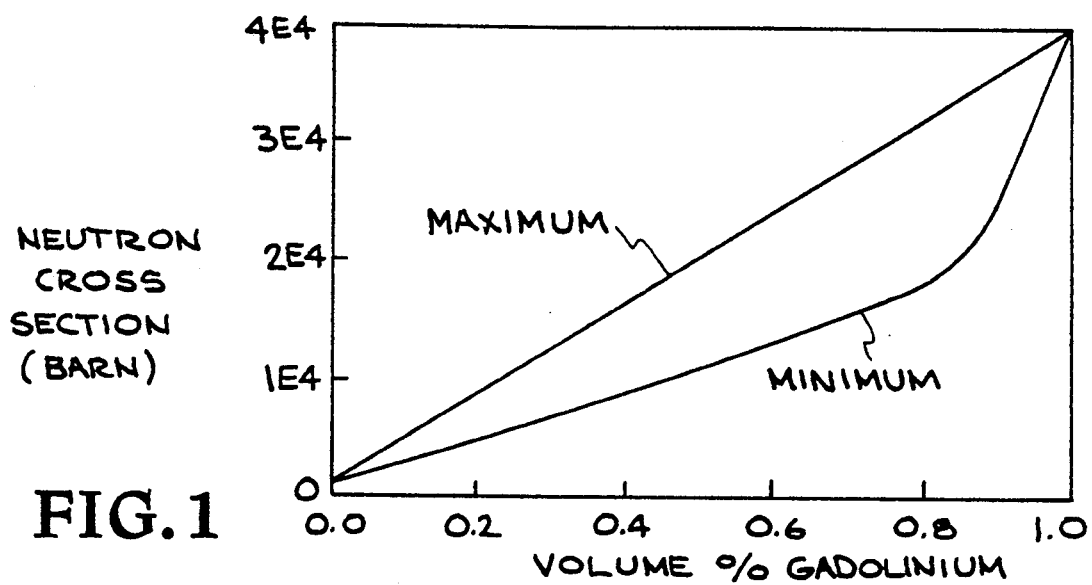
FIG. 1 is a graph of neutron capture cross section versus gadolinium content in boron-carbide-gadolinium composites.

Combining Gd or $Gd_2O_3$ with $B_4C$, or combining $Gd_2O_3$ with Gd allows the useful nuclear, thermal, and mechanical properties of each phase to act together to form refractory composites for practical nuclear applications. In particular, these composites offer properties that can be controlled through various processing routes to obtain high neutron capture ability, reduced weight, thermal shock resistance, improved fracture toughness, corrosion and oxidation resistance. Calculated neutron absorption values (minimum and maximum) for $B_4C$-Gd cermets and $B_4C$-Gd metal-matrix composites are given in FIG. 1.

Potential applications of $B_4C$-Gd, $B_4C$-$Gd_2O_3$, and $Gd_2O_3$-Gd refractory composites include, but are not limited to, neutron shielding, control rods, burnable absorbers, secondary shutdown systems, spent fuel storage containers, transportation casks, personnel protection, protection of electronics, and other waste handling or encapsulation applications requiring neutron attenuation. These composites can also serve as cathodes and anodes in long-life electronic devices and laser systems.

The methods for forming $B_4C$-Gd, $B_4C$-$Gd_2O_3$, and $Gd_2O_3$-Gd refractory composites are described in the following. The methods include three principal steps, including (1) consolidation or preparation of the starting materials, (2) densification by producing the right capillarity-thermodynamic condition in the case of systems processed above the melting point of Gd, or by producing the correct plastic flow conditions in the case of systems processed below the melting point of Gd, or by producing the correct interphase diffusion and rearrangement conditions in the case of processing with non-metallic phases, (3) reacting the starting materials to produce the desired compositions.

CONSOLIDATION OF STARTING MATERIALS

Correct preparation of the starting materials is required to produce fully dense microstructures or at least microstructures with negligible porosity. Preparation and consolidation of the starting materials involves three steps: Selection of the appropriate starting particle size distributions, dispersion and uniform mixing of the appropriate particles, and consolidation of these particles in a very homogeneous manner.

Selecting the correct particle size distributions of the starting materials is important because it directly affects densification and reaction kinetics. That is, large particles will have much less surface area than small particles, making the available surface for chemical reactions smaller. In addition, the selection of several different particle size distributions in combination can enhance the particle packing density making microstructural rearrangement distances substantially smaller thereby promoting densification and reaction product formation.

Uniform mixing of the starting constituents can be performed by mechanical mixers or vibratory shakers; however, optimum uniformity is usually obtained through the use of colloidal techniques. Colloidal mixing involves the dispersion of the starting particles in a compatible liquid medium. The dispersion may be electrostatic, steric, or a combination of the two depending on the surface characteristics of the particles being dispersed. Mixing is then accomplished by ultrasonication of the particle-fluid slip. Other mixing techniques may be used but they are generally not as effective as ultrasonic methods.

The final step in controlling the packing morphology of the green or prefired body involves the actual consolidation of the particles into a desired shape. To do this, a method for removing the dispersion fluid must be used. This can be as simple as filtering out the solid particles prior to cold pressing them to shape, or it may involve the use of slip casting or pressure casting techniques where the fluid is sucked or pushed out of the slip, respectively. Other, more advanced methods, such as injection molding or extrusion of the starting constituents may also be used.

DENSIFICATION

Once the conditions for achieving the optimum packing morphology have been obtained, the second step, in the case of systems processed above the melting point of Gd (e.g., $B_4C$-Gd cermets and $Gd_2O_3$-Gd cermets), is to apply the capillarity thermodynamic criteria of achieving rapid densification through the kinetics of microstructural rearrangement via liquid-phase sintering. Due to a greater degree of reactivity, it is more difficult to obtain this rapid consolidation in the case of $B_4C$-Gd cermets than it is in the case of $Gd_2O_3$-Gd cermets, and the former requires the application of pressure with temperature to externally accelerate the densification kinetics.

In $Gd_2O_3$-Gd cermets, the criterion of a low contact angle of the liquid Gd on the solid $Gd_2O_3$ must be achieved. This condition is often referred to as wetting. In $B_4C$-Gd cermets, the external application of pressure negates this requirement; however, any wetting of solid $B_4C$ by liquid Gd will assist the rearrangement process during pressing.

Figure 2A:
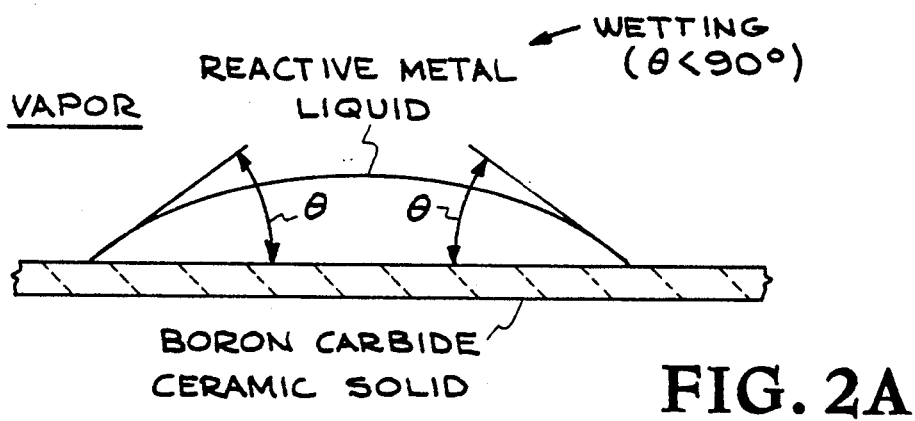
FIGS. 2A and 2B illustrate the wetting step in accordance with the invention.
Figure 2B:
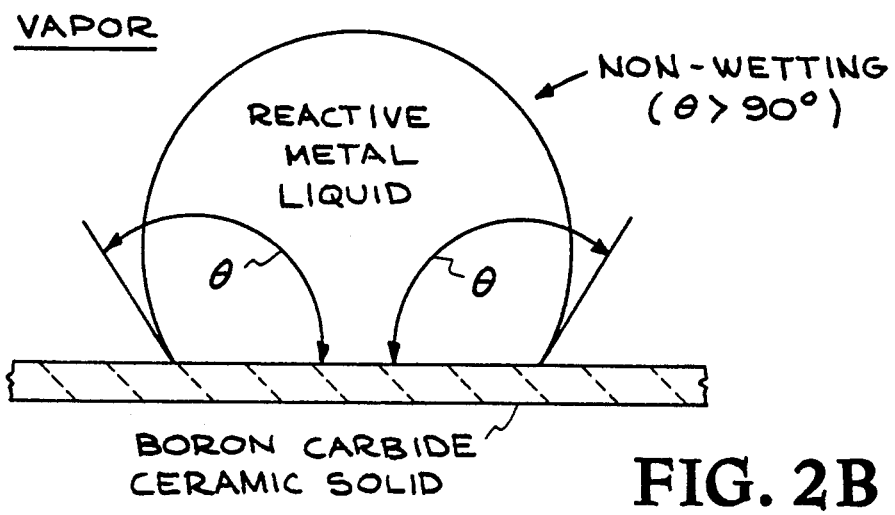

Wetting is defined as any process in which a solid-liquid interface is formed such that the measured angle through the molten liquid phase is acute. This is illustrated in FIG. 2A. Non-wetting is illustrated in FIG. 2B. The driving force for wetting is a reduction in free energy of the system, where the system is defined as the local solid, liquid, and vapor phases that coexist.

During wetting in $B_4C$-Gd and $Gd_2O_3$-Gd cermets, chemical nonequilibrium thermodynamic conditions exist between the solid, liquid, and vapor phases of the system. This nonequilibrium manifests itself in the form of interfacial reactions that continue until a state of chemical equilibrium is reached in the system.

Interfacial chemical reactions result in mass transfer across the $B_4C$-Gd or $Gd_2O_3$-Gd interfaces. Mass transfer results in a net decrease in the system free energy and usually begins and continues during sintering until chemical equilibrium is achieved. This process ultimately results in the formation of interfacial reaction products.

Contact-angle measurements can be made to quantify this wetting phenomenon. This is easily done by heating the Gd metal atop a polished substrate of $B_4C$ or $Gd_2O_3$. The contact angle is then measured in-situ and recorded.

Figure 3:
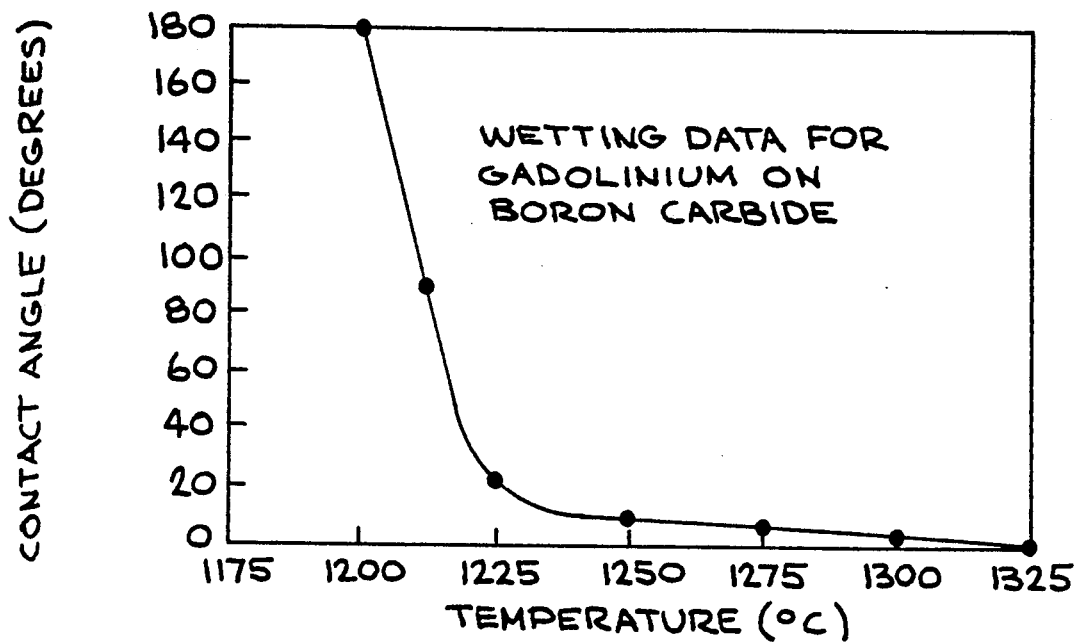
FIG. 3 is a graph of contact angle data for gadolinium metal in a boron-carbide substrate.

As an example, contact angle data for Gd on a $B_4C$ substrate is presented in FIG. 3 which shows the contact angle as a function of temperature in a vacuum environment of $\approx 10^{-4}$ torr. It is also important to consider the time variable in making these measurements. Without the three coupled variables; temperature, time, and pressure, it is not possible to accurately replicate the conditions necessary to achieve a desired wetting condition. Processing temperatures for producing $B_4C$-Gd cermets, under wetting conditions alone, are in the range of just above 1200° C. to 1300° C. Processing times, due to the very reactive nature of this system, are typically less than 10 minutes.

It is interesting to note that wetting in the $B_4C$-Gd system occurs below the 1313° C. melting point of Gd. This must be due to existence of a B-C-Gd ternary eutectic. There is no published phase equilibria for this system; however, a 1180° C. binary eutectic is reported for the B-Gd system indicating a high-probability for this conclusion.

The time parameter is particularly important and the one that constrains the liquid-phase sintering of $B_4C$-Gd and $Gd_2O_3$-Gd cermets the most. This is because mass transfer across the interfaces in these cermets is time dependent. The higher degree of reactivity in a $B_4C$-Gd cermet indicates that mass transfer across its interface is greater/faster than mass transfer across $Gd_2O_3$-Gd interfaces. The application of external pressure to the sintering process using hot pressing or hot isostatic pressing changes the time scale for rearrangement and can allow densification to occur much quicker.

Figure 4:
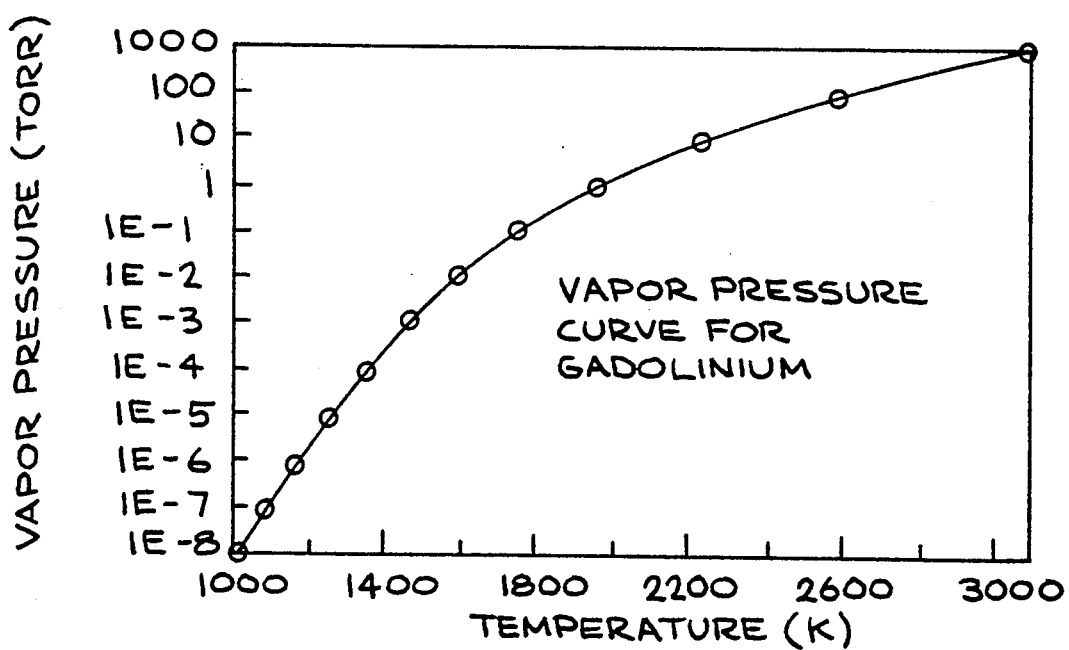
FIG. 4 is a vapor pressure curve for gadolinium.

The parameter of atmosphere is also important because it affects the vapor phase in the solid-liquid-vapor system. This becomes a significant issue when processing molten Gd at pressures below its vapor pressure. Published vapor pressure data for Gd is plotted in FIG. 4 and indicates that vacuum processing of material systems containing Gd could occur without evaporation of molten Gd at temperatures between 1200°-1300° C. (1473-1573K) when the atmospheric pressure remains at or above $\approx 10^{-2}$ torr. Actual vacuum processing of systems containing molten Gd have shown that the kinetics of evaporation for Gd are slow and that processing at $10^{-4}$ torr is possible with minimal contamination to the furnace.

The key point of the second step of this invention, as applied to $B_4C$-Gd and $Gd_2O_3$-Gd cermets, is that highly reactive systems like $B_4C$-Gd require the application of external pressure to achieve densification. This implies that squeeze casting, hot pressing or hot isostatic pressing will be required to densify these compositions. In less reactive systems like $Gd_2O_3$-Gd, the application of pressure is not required and complete densification can be achieved by pressureless sintering or liquid-metal infiltration techniques.

In the case of systems processed below the melting point of Gd (e.g., $B_4C$-Gd or $Gd_2O_3$-Gd metal-matrix composites), the second step of the invention is densification by establishing the correct plastic flow conditions such that the Gd metal will flow around the $B_4C$ or $Gd_2O_3$ ceramic phases.

Figure 5:
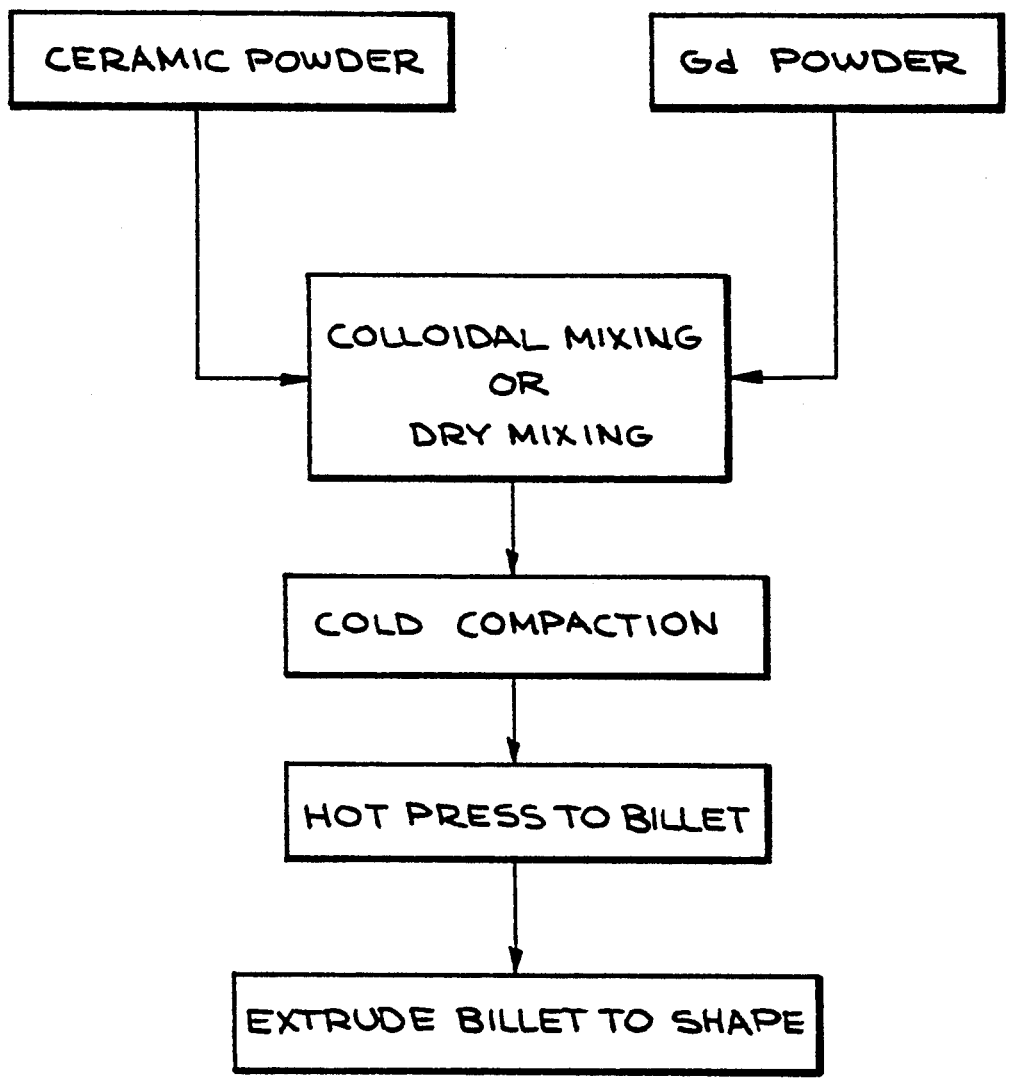
FIG. 5 is a flow chart of the fabrication sequence for producing boron-carbide-gadolinium and gadolinium-oxide-gadolinium metal-matrix composites.

The whole process is dependent on the work hardening, recovery, recrystallization, and grain growth of Gd metal in combination with particles, whiskers, or fibers of $B_4C$ or $Gd_2O_3$. A flow chart of the fabrication sequence for metal-matrix composites is given in FIG. 5.

$B_4C$ or $Gd_2O_3$ material is mixed with atomized Gd powder in the desired proportions either dry, or wet (colloidal) and then dried. The mixture is then compacted at room temperature using axial or isostatic cold pressing methods. This compact is either vacuum hot pressed or induction melted into a billet and the billet subsequently extruded.

Vacuum hot pressing or induction melting is an operation where the metal+ceramic billet is taken to near the B-C-Gd ternary eutectic temperature ($\approx 1200°$ C.) in the case of $B_4C$-Gd metal-matrix composites, or to near the liquidus of Gd ($\approx 1300°$ C.) in the case of $Gd_2O_3$-Gd metal-matrix composites.

In the case of vacuum hot pressing, once the billet is pressed to full density, the die is then cooled to a temperature below the solidus of Gd (approximately 100° C. below the liquidus or eutectic temperature) while maintaining pressure and vacuum, the billet removed from the die, and then from the hot press. In the case of induction melting, the metal+ceramic mixture is heated in a vacuum induction furnace to at least the melting point of Gd, inductively mixed in the molten state, allowed to cool, and then removed from the furnace and crucible.

After vacuum hot pressing or induction melting the billet is extruded through a die at a temperature $\approx 75\%$ of the eutectic or liquidus temperature. Other conventional metal working procedures may also be carried out on the billets. The extrusion of tubes, rods, plates, bars, and shaped sections are possible. Forging, rolling, and squeeze casting operations are also feasible with $B_4C$-Gd and $Gd_2O_3$-Gd metal-matrix composites.

Extrusion, forging, rolling, and casting pressures vary widely depending on the process, but more importantly depending on the ceramic solids loading of the composite being worked with, higher pressures being required the greater the ceramic content. Nominal pressures are used with ceramic loadings up to 25 vol. %. Substantially higher pressures are required up through 40 vol. % ceramic constituent and subsequent hot isostatic pressing may be required to densify metal matrix composites with initial ceramic contents between 40–50 vol. %.

The key point of the second step of this invention, as applied to $B_4C$-Gd and $Gd_2O_3$-Gd metal-matrix composites, is that highly reactive systems like $B_4C$-Gd require consolidation at temperatures near the B-C-Gd ternary eutectic temperature in order to maximize the plastic flow of the Gd matrix material around the $B_4C$ particles, fibers, or whiskers. In less reactive systems like $Gd_2O_3$-Gd, the consolidation temperature must be closer to the liquidus of the Gd matrix for optimizing the plastic flow around $Gd_2O_3$ particles, fibers, or whiskers.

In the case of systems processed from refractory starting constituents (e.g., $B_4C$-$Gd_2O_3$ composites), the second step of this invention involves producing the correct interphase diffusion and rearrangement conditions such that the composite can achieve a fully dense state.

This is accomplished primarily by solid-state diffusion; however, viscous flow and liquid diffusion are also potential contributors to the process. Solid-state sintering occurs readily between $Gd_2O_3$ grains due primarily to the ionic nature of this phase. $B_4C$, on the other hand, does not easily sinter due to its covalent nature and low volume and grain boundary diffusion rates. Hence, $B_4C$-$Gd_2O_3$ systems that are $Gd_2O_3$ rich should be easier to sinter than systems that are $B_4C$ rich. This latter category, as well as the former, can be densified using liquid-phase sintering techniques.

Sintering in the presence of a liquid phase is a way of bonding two or more materials, which have different melting points, into dense bodies without complete fusion of the more refractory $Gd_2O_3$ or $B_4C$ phases. This type of sintering is unique in that the system remains multiphase throughout the entire process and the maximum temperature attained is between the liquidus and solidus of the system. The previously discussed liquid-phase sintering of cermets showed how Gd was used as the liquid phase. In the case of $B_4C$-$Gd_2O_3$ compositions, the $Gd_2O_3$ phase or another phase becomes the liquid.

There are basically two types of sintering that can occur in the presence of a liquid phase. The first type, liquid-phase sintering, uses a material transport mechanism involving viscous flow and diffusion. The other type, reactive liquid sintering, uses a material transport mechanism of viscous flow and solution precipitation. Both of these mechanisms have the same driving force which evolves from capillary pressures and surface tensions occurring within the composite during sintering.

It is widely accepted that the sintering of nonoxide ceramics, like $B_4C$, to theoretical density is only possible with the aid of certain additions of impurities which result in the formation of a liquid phase. Without such additives it is necessary to apply pressure to the system in order to force it to densify.

In $Gd_2O_3$-rich $B_4C$-$Gd_2O_3$ composites the primary driving force for densification is the difference in free energy or chemical potential between the free surfaces of $Gd_2O_3$ particles and the points of contact between adjacent $Gd_2O_3$ particles. This solid-state diffusion process between the $Gd_2O_3$ particles involves material transport by surface and volume diffusion. Surface diffusion does not result in densification; however, volume diffusion does. Volume diffusion occurs along grain boundaries and through lattice dislocations. Consequently, a system that is rich in $Gd_2O_3$ should sinter to near full density without the application of external pressure to the system. In addition, the reaction products that form between $Gd_2O_3$ and $B_4C$ (e.g., $GdBO_3$, $GdB_3O_6$, $B_2O_3$, etc.) may also serve as sintering aids to densification.

In $B_4C$-rich $B_4C$-$Gd_2O_3$ composites, just the opposite occurs. There are not enough free surfaces and points of contact with respect to the $Gd_2O_3$ phase and consequently densification is severely inhibited. This is quickly overcome, however, by use of hot pressing or hot isostatic pressing methods.

Figure 6:
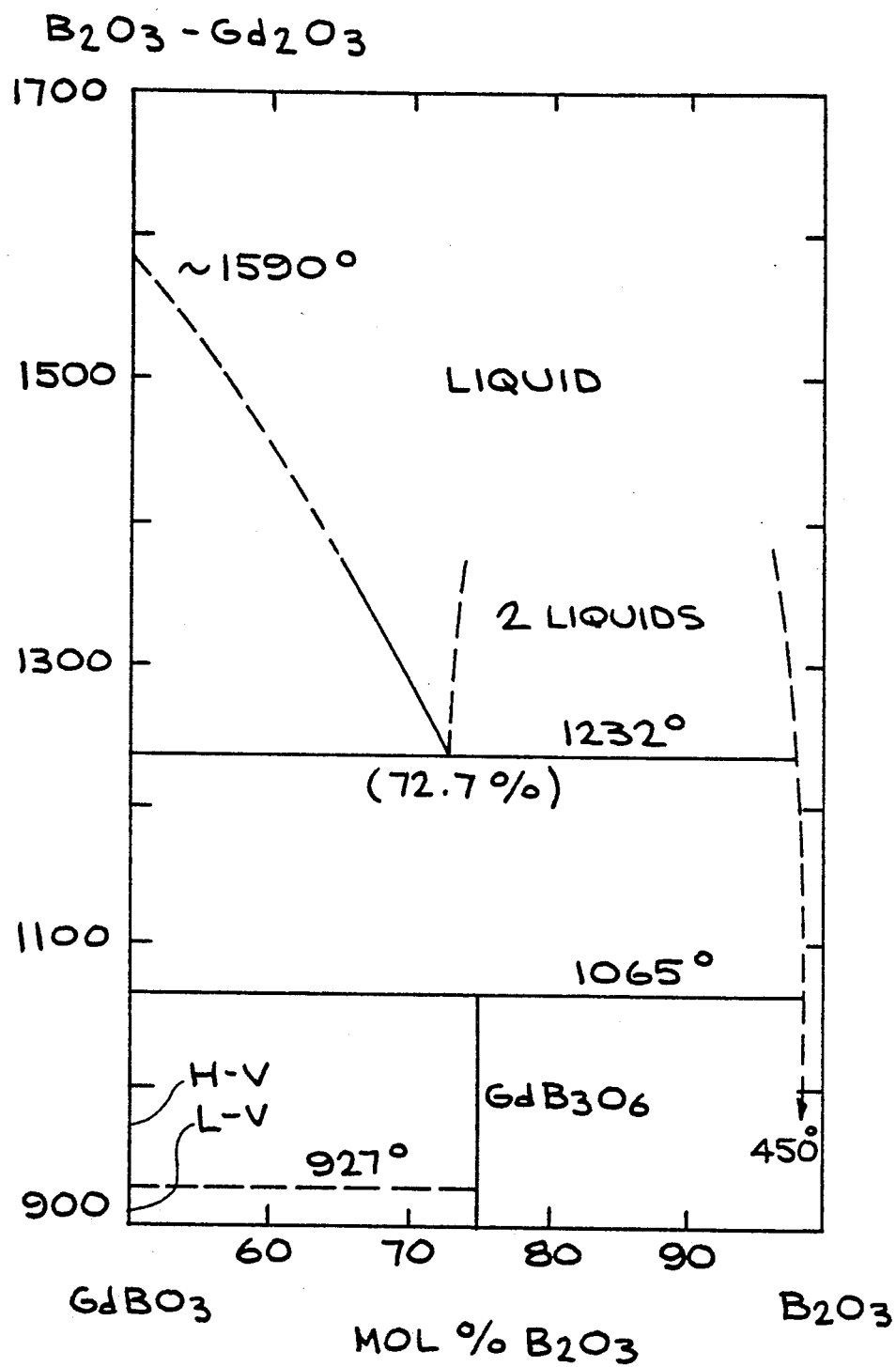
FIG. 6 is the phase equilibrium diagram for the $GdBO_3$-$B_2O_3$ pseudooinary system.

$Gd_2O_3$ melts at $\approx 2320°$ C., forms a gadolinium borate ($GdBO_3$) that melts at $\approx 1590$ .C, and forms a binary eutectic with $B_2O_3$ at $\approx 1230°$ C. $B_4C$, on the other hand, melts at $\approx 2350°$ C. but can form a $B2O3$ surface layer in the presence of oxygen at much lower temperatures. This shared characteristic between $Gd_2O_3$ and $B_4C$ assists in the densification of $B_4C$-$Gd_2O_3$ composites by providing a low temperature sintering aid for the system. FIG. 6 shows the phase equilibria for the $GdBO_3$-$B_2O_3$ pseudobinary system. The formation of a low melting point borate and eutectic clearly indicates that liquid-phase densification is possible in $B_4C$-$Gd_2O_3$ composites.

The key point of the second step of this invention, as applied to $B_4C$-$Gd_2O_3$ composites, is that $Gd_2O_3$-rich systems do not require the application of external pressure for densification while $B_4C$-rich systems do.

Reaction Thermodynamics

If molten-metal liquid-phase sintering is to occur, the $B_4C$-Gd or $Gd_2O_3$-Gd mixture must satisfy the reaction-thermodynamic criterion that the solid $B_4C$ phase and any metastable gadolinium-borocarbide, gadolinium-boride, gadolinium-carbide compounds or solid solutions be partially soluble in the liquid Gd or alloy phases present; or that the solid $Gd_2O_3$ phase and any metastable gadolinium-oxide compounds or solid solutions be partially soluble in the liquid Gd or alloy phases present.

If solid-state sintering and/or liquid-phase sintering is to occur in $B_4C$-$Gd_2O_3$ composites, then the $B_4C$-$Gd_2O_3$ mixture must satisfy the reaction-thermodynamic criterion that the solid $B_4C$ and $Gd_2O_3$ phases and any metastable gadolinium-borocarbonate, gadolinium-borate, gadolinium-carbonate, gadolinium-borocarbide, gadolinium-boride, adolinium-carbide, gadolinium-oxide compounds or solid solutions be partially soluble in the liquid $GdBO_3$, liquid $B_2O_3$, or other liquid phases present.

To fully understand how a particular $B_4C$-Gd, $Gd_2O_3$-Gd, or $B_4C$-$Gd_2O_3$ composite will react at different processing isotherms, one must consider both thermodynamic and kinetic issues for each respective composition. Merely examining phase-equilibria data is often times not enough. This is because reactive compositions typically form metastable interfacial phases. In many cases, the phase diagrams are not available anyway.

Hence, detailed studies using x-ray diffraction and optical metallographic equipment must be employed. The studies on each respective system need to be done in incremental steps, evaluating the composition as a function of processing history. Only in this way, can metastable phases and equilibrium reaction products be correctly identified in a detailed fashion.

In a more general sense, however, its is possible to determine the range of compositions that are obtained from each respective system. The composition ranges obtained for the $B_4C$-Gd, $Gd_2O_3$-Gd, and $B_4C$-$Gd_2O_3$ composites of this invention are presented in Tables I-III.

TABLE I. Semi-quantitative x-ray diffraction analysis of $B_4C$-Gd composites.
For Cermets (measured)
  Major phase: New unknown phase(s)
  Secondary phases: $GdB_4$, $GdC_2$, $B_8C(?)$
  Minor phases: GdBC, $Gd_2C_3$, Gd, $B_4C$, $B_{13}C_2$, $GdB_{66}$, free boron(?)
  Trace phases: $Gd_2B_5$, $B_{25}C$, $GdB_2(?)$, $GdB_6(?)$, C(?)
For Metal-Matrix Composites (estimated)
  Major phase: Gd
  Secondary phases: New unknown phase(s)
  Minor phases: $GdB_4$, $GdC_2$, $B_8C(?)$
  Trace phases: GdBC, $Gd_2C_3$, Gd, $B_4C$, $B_{13}C_2$, $GdB_{66}$, free boron(?)

TABLE II. Semi-quantitative x-ray diffraction analysis of $Gd_2O_3$-Gd composites.
For Cermets (measured)
  Major phase: $Gd_2O_3$ (gadolinium III oxide)
  Secondary phase: Gd
  Minor phases: $Gd_2O_3$ (gadolinium oxide), GdO(?)
  Trace phases: $Gd_2O_3$ (high-temperature, metastable)
For Metal-Matrix Composites (estimated)
  Major phase: Gd
  Secondary/Minor phase: $Gd_2O_3$(gadolinium III oxide)
  Trace phases: $Gd_2O_3$ (gadolinium oxide), GdO(?)

TABLE III. Semi-quantitative x-ray diffraction analysis of $B_4C$-$Gd_2O_3$ composites.
For $Gd_2O_3$-rich Composites (measured/estimated)
  Major phase: $Gd_2O_3$
  Secondary phase: $B_4C$
  Minor/Trace phases: $GdBO_3$, $GdB_3O_6(?)$, $B_2O_3(?)$, New unknown phase(s), other $B_4C$-Gd phases (?)
For $B_4C$-rich Composites (measured/estimated)
  Major phase: $B_4C$
  Secondary phase: $Gd_2O_3$
  Minor/Trace: New unknown phase(s), $GdB_4$, $GdC_2$, $B_8C(?)$, $GdBO_3$, $GdB_3O_6(?)$, $B_2O_3(?)$, other $B_4C$-Gd phases Tables I and III indicate the confirmation of a new composition of matter. It is noted as "New unknown phase(s)" in the tables because more than one new phase may be present. At this time, the x-ray diffraction peaks associated with this finding also may actually indicate (1) only a portion of the diffraction peaks, i.e., some peaks may be masked by the presence of larger overlapping peaks; and (2) the existence of other phases' peaks may accidentally be included in the reported peaks below. Table IV gives the approximate peak locations (d-spacing) and estimated peak height ($I/I_o$).

TABLE IV

Approximate d-spacing and estimated intensity of x-ray diffraction peaks for the new phase(s) present in $B_4C$—Gd and $B_4C$—$Gd_2O_3$ composites.

| d-spacing (Angstroms) | Intensity ($I/I_o$) |
|---|---|
| 8.0870 | 100 |
| 5.7306 | ≦85 |
| 3.5660 | ≦41 |
| 3.7837 | ≦38 |
| 1.7299 | ≦35 |
| 1.7094 | ≦34 |
| 1.2942 | 33 |
| 2.1944 | ≦33 |
| 1.9714 | 33 |
| 1.0262 | 33 |
| 1.2423 | 33 |
| 1.3176 | 32 |
| 1.7747 | 31 |

It is anticipated that the new phase(s) is/are ternary gadolinium borocarbide(s).

Phases shown in Tables I-III with a (?) indicate that the existence of this phase is likely; however, there is not enough evidence, based on the current analysis, to say for sure if it is really present or not.

It is important to point out that subsequent heat treatment of all the compositions of this invention will result in diminishing the major indicated phases and promoting the growth of some of the less prevalent phases (secondary, minor, and/or trace phases).

Figure 7:
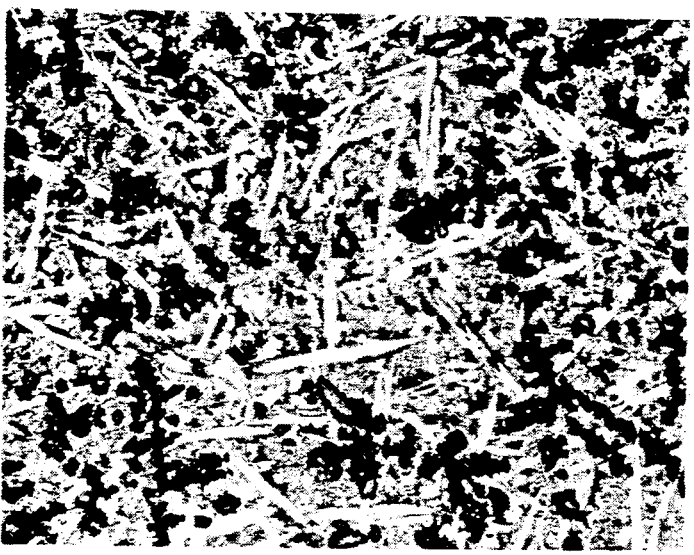
FIG. 7 is a microstructure of a boron-carbide-gadolinium cermet.
Figure 8:
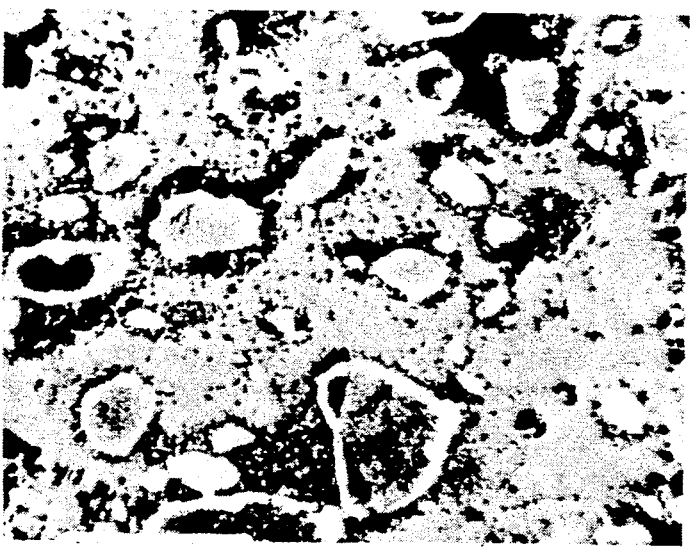
FIG. 8 is a microstructure of a boron-carbide-gadolinium-oxide composite.
Figure 9:
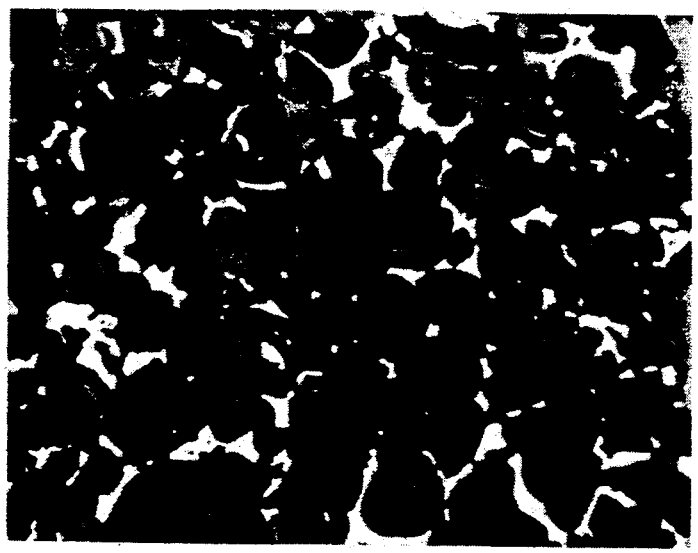
FIG. 9 is a microstructure of a gadolinium-oxide-gadolinium cermet.

Examples of some refractory neutron absorbing compositions of matter, in accordance with the invention, are given in FIGS. 7-9. FIGS. 7, 8, and 9 show the microstructures of a $B_4C$-Gd cermet, a $B_4C$-$Gd_2O_3$ composite, and a $Gd_2O_3$-Gd cermet, respectively.

EXAMPLE 1

Start with −325 mesh Gd powder and −325 mesh $B_4C$ powder. Weigh out a 60 vol. % $B_4C$ and 40 vol. % Gd sample. Ultrasonically mix the two powders together in a methanol slip. Filter out the methanol and dry back the mixture. Pour the mixture into a boron nitride lined, reinforced graphite punch and die assembly. Place assembly with mixture in a vacuum hot press and apply 3 ksi pressure to punches. Rapidly heat to 1250° C. in a vacuum of $\approx 10^{-4}$ torr. On passing through 1200° C. increase applied pressure to 10 ksi. Hold at 1250° C. until pressing action ceases. Furnace cool part under vacuum while maintaining 10 ksi. At 1000° C. reduce applied pressure to 3 ksi and continue cooling to room temperature. Remove part from assembly. Result: $B_4C$-Gd cermet comprising

| New unknown phase(s) | 47 vol. % |
|---|---|
| $GdB_4$ | 21 vol. % |
| $GdC_2$ | 19 vol. % |
| other, per Table I | 13 vol. % |

EXAMPLE 2

Start with −325 mesh Gd powder and 10 μm $Gd_2O_3$ powder. Weigh out a 75 vol. % $Gd_2O_3$ and 25 vol. % Gd sample. Press only the $Gd_2O_3$ powder in a steel punch and die assembly at 10 ksi. Remove the porous $Gd_2O_3$ compact from the die and place it inside the bed of the Gd powder resting in a graphite lined tungsten crucible. Cover the crucible and place complete assembly in a vacuum furnace. Rapidly heat to 1350° C. under a vacuum of $\approx 10^{-4}$ torr. Hold at 1350° C. for 10 minutes to allow molten Gd metal to infiltrate into the $Gd_2O_3$ preform. Furnace cool to room temperature and remove solidified melt from the crucible. Machine away any residual Gd metal that did not infiltrate. Result: $Gd_2O_3$-Gd cermet comprising

| $Gd_2O_3$ (III) | 68 vol. % |
| Gd | 22 vol. % |
| other, per Table II | 10 vol. % |

EXAMPLE 3

Start with −40 mesh Gd powder and −325 mesh $B_4C$ powder. Weigh out a 20 vol. % $B_4C$ and 80 vol. % Gd sample. Mechanically vibrate the mixture for 5 minutes. Pour the mixture into a steel/graphite punch and die assembly and compact at 20 ksi. Place the assembly with mixture into a vacuum hot press and heat to 1200° C. under a vacuum of $\approx 10^{-3}$ torr. Maintain 7 ksi during heat up and hold at 1200° C. until compaction ceases. Cool at 50° C. per minute under vacuum while maintaining 7 ksi applied pressure. On passing down through 900° C. reduce applied pressure to 3 ksi. Cool to room temperature and remove billet. Extrude billet with an extrusion ratio of 1:10 at a temperature of 980° C. Finally, heat treat extruded part for 3 hours at 1100° C. Result: $B_4C$-Gd metal-matrix composite comprising

| Gd | 55 vol. % |
| New unknown phase(s) | 28 vol. % |
| $GdB_4$ | 8 vol. % |
| $GdC_2$ | 6 vol. % |
| other, per Table I | 3 vol. % |

EXAMPLE 4

Start with −40 mesh Gd powder and 10 μm $Gd_2O_3$ powder. Weigh out a 15 vol. % $Gd_2O_3$ and 85 vol. % Gd sample. V-blend the powders together for 30 minutes. Place the mixture in a susceptor crucible and place in an induction melting furnace. Inductively heat the assembly at 1400° C. in a vacuum of $10^{-2}$ torr for 1 hour. Furnace cool to room temperature and remove billet from crucible. Extrude billet at an extrusion ratio of 1:8 at a temperature of 900° C. Finally, heat treat the part at 1000° C. for 2 hours. Result: $Gd_2O_3$-Gd metal-matrix composite comprising

| Gd | 64 vol. % |
| $Gd_2O_3$ (III) | 25 vol. % |
| other, per Table II | 11 vol. % |

EXAMPLE 5

Start with −20 μm $B_4C$ powder and −10 μm $Gd_2O_3$ powder. Weigh out a 65 vol. % $B_4C$ and 35 vol. % $Gd_2O_3$ sample. Prepare a sterically stabilized colloidal suspension and ultrasonicate the slip for 3 minutes. Pressure cast the slip at 80 psi for 24 hours. Remove green part from the pressure caster and place in a graphite punch and die assembly. Place the assembly in a hot press. Hot press the green body at 1950° C. with an applied pressure of 5 ksi in flowing argon. Cool at 25° C. per minute down through 500° C. while maintaining 5 ksi applied pressure. On passing 500° C. cool at 100° C. per minute while maintaining only 3 ksi applied pressure. Remove part from die at room temperature. Result: $B_4C$-rich $B_4C$-$Gd_2O_3$ composite comprising

| $B_4C$ | 62 vol. % |
| $Gd_2O_3$ | 33 vol. % |
| other, per Table III | 5 vol. % |

EXAMPLE 6

Start with 1-3 μm $B_4C$ powder and −10 μm $Gd_2O_3$ powder. Weigh out a 30 vol. % $B_4C$ and 70 vol. % $Gd_2O_3$ sample. Apply electrostatic dispersion techniques to obtain a slip. Ultrasonicate slip for 5 minutes in an ice bath. Slip cast slurry into plaster mold. Remove green part and vacuum dry at 100° C. and 50 millitorr for 12 hours. Place green part in inert gas furnace and fire at 1850° C. for 1 hour. Cool at 50° C. per minute to room temperature. Result: $Gd_2O_3$-rich $B_4C$-$Gd_2O_3$ composite comprising

| $Gd_2O_3$ | 66 vol. % |
| $B_4C$ | 27 vol. % |
| other, per Table III | 7 vol. % |

OTHER APPLICABLE COMPOSITES

Although the best compositions for neutron absorption are those using Gd metal (or alloy), upon which this invention is based, there are several other metals that may be combined with $B_4C$ or $Gd_2O_3$ to form other cermet and metal-matrix compositions, which may be useful for the same or other applications. The metals that can be used in accordance with the methods of this invention are Cd, In, Te, Pb, Ce, Pr, Nd, Sm, Eu, Gd, Tb, Dy, Ho, Er, Tm, Yb, Lu, and alloys thereof.

Changes and modifications in the specifically described embodiments can be carried out without departing from the scope of the invention which is intended to be limited only by the scope of the appended claims.

We claim:

1. A method of forming a neutron absorbing refractory composite material, comprising:
   selecting a pair of initial reactants from the group consisting of: (a) gadolinium or alloys thereof, (b) boron carbide, and (c) gadolinium oxide;
   consolidating the initial reactants;
   densifying the consolidated initial reactants;
   reacting the densified initial reactants to produce a material of preselected composition having a plurality of interfacial reaction product phases.

2. The method of claim 1 wherein the initial reactants are in the form of particles, fibers, or whiskers.

3. The method of claim 1 wherein the step of consolidating the initial reactants comprises:
   selecting starting particle size distributions;
   dispersing and mixing the particles;

consolidating the dispersed and mixed particles substantially homogeneously.

4. The method of claim 1 for producing a $B_4C$-Gd or $Gd_2O_3$-Gd cermet, wherein the step of densifying the initial reactants comprises wetting the $B_4C$ or $Gd_2O_3$ phase by the Gd metal phase.

5. The method of claim 1 for producing a $B_4C$-Gd or $Gd_2O_3$-Gd metal-matrix composite, wherein the step of densifying the initial reactants comprises producing plastic flow of the Gd metal phase around the $B_4C$ or $Gd_2O_3$.

6. The method of claim 1 for producing a $B_4C$-$Gd_2O_3$ composite wherein the step of densifying comprises producing interphase diffusion and rearrangement.

7. The method of claim 1 wherein the step of reacting is performed by heating at a preselected temperature for a preselected time.

8. The method of claim 3 wherein the step of selecting starting particle size distributions comprises selecting a plurality of different particle sizes to enhance particle packing density.

9. The method of claim 3 wherein the step of dispersing and mixing is performed by colloidal dispersion and ultrasonic mixing.

10. The method of claim 3 wherein the step of consolidating is selected from:
 (a) filtering followed by cold pressing,
 (b) slip casting,
 (c) pressure casting.

11. The method of claim 1 wherein the step of consolidating is performed by injection molding or extruding the initial reactants.

12. The method of claim 1, for producing a $B_4C$-Gd cermet, further comprising applying external pressure during the densification step.

13. The method of claim 12 comprising performing the step of densification by squeeze casting, hot pressing, or hot isostatic pressing.

14. The method of claim 1, for producing a $B_4C$-Gd cermet, wherein the densification step is performed at a temperature of about 1200° C.–1300° C. for a time of less than about 10 minutes.

15. The method of claim 4, for producing a $Gd_2O_3$-Gd cermet, wherein the densification step is performed by pressureless liquid-phase sintering or liquid-metal infiltration.

16. The method of claim 5, for producing a $B_4C$-Gd metal-matrix composite, wherein the densification step is performed at about the B-C-Gd ternary eutectic temperature (1200° C.).

17. The method of claim 5, for producing a $Gd_2O_3$-Gd metal-matrix composite, wherein the densification step is performed at about the liquidus temperature of Gd (1300° C.).

18. The method of claim 5 wherein the densification step is performed by vacuum hot pressing or induction melting.

19. The method of claim 6, for producing a $Gd_2O_3$-rich composite, wherein the densification step is performed by solid-state diffusion.

20. The method of claim 6, for producing a $B_4C$-rich composite, wherein the densification step is performed by liquid-phase sintering.

21. The method of claim 20 further comprising applying external pressure during the densification step.

22. The method of claim 21 wherein the densification step is performed by hot pressing or hot isostatic pressing.

23. A method of forming a ceramic-metal composite material comprising:
 selecting a ceramic phase from $B_4C$ and $Gd_2O_3$, and a metal phase from Cd, In, Te, Pb, Ce, Pr, Nd, Sm, Eu, Gd, Tb, Dy, Ho, Er, Tm, Yb, Lu, and alloys thereof;
 consolidating the ceramic phase and metal phase;
 densifying the consolidated ceramic and metal phases;
 reacting the densified ceramic and metal phases to produce a plurality of interfacial reaction product phases.

* * * * *